(12) United States Patent
Evans (10) Patent No.: US 10,686,849 B2
(45) Date of Patent: *Jun. 16, 2020

(54) DATA PROCESSING (71) Applicant: Metaswitch Networks Ltd, Enfield (GB)

(72) Inventor: Michael Jeffrey Evans, Enfield (GB)

(73) Assignee: Metaswitch Networks Ltd., Enfield (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/009,958

(22) Filed: Jun. 15, 2018

(65) Prior Publication Data
US 2019/0020693 A1    Jan. 17, 2019

Related U.S. Application Data

(63) Continuation of application No. 14/696,138, filed on Apr. 24, 2015, now Pat. No. 10,051,014.

(30) Foreign Application Priority Data

Apr. 25, 2014    (GB) .................................. 1407344.9

(51) Int. Cl.
*H04L 12/28* (2006.01)
*H04L 29/06* (2006.01)

(52) U.S. Cl.
CPC ...... *H04L 65/1069* (2013.01); *H04L 65/1006* (2013.01); *H04L 65/1016* (2013.01); *H04L 65/1073* (2013.01)

(58) Field of Classification Search
USPC ........................................ 370/392, 259, 389
See application file for complete search history.

(56) References Cited

U.S. PATENT DOCUMENTS

| 10,051,014 B2* | 8/2018 | Evans ................ H04L 65/1016 |
| 2005/0114513 A1* | 5/2005 | Dorenbosch ...... H04L 29/12094 709/227 |
| 2007/0019634 A1* | 1/2007 | Fisher ............... H04L 29/06027 370/352 |
| 2009/0067411 A1* | 3/2009 | Heidermark ...... H04L 29/06027 370/352 |
| 2009/0129388 A1* | 5/2009 | Akhtar .................... H03M 7/30 370/392 |

(Continued)

FOREIGN PATENT DOCUMENTS

EP    2175604 A1    4/2010

*Primary Examiner* — Phuongchau Ba Nguyen
(74) *Attorney, Agent, or Firm* — EIP US LLP (57) ABSTRACT

Measures for use in processing data in a telecommunications network. A request message is received in relation to establishment of a communication session involving a given subscriber. Subscriber configuration data is received in relation to the establishment. The subscriber configuration data includes a set of one or more trigger points at which one or more application services should be invoked in relation to communication sessions for the given subscriber. At least one trigger point from the set of trigger points is encoded into an identifier for the communication session within the request message. The request message including the identifier for the communication session in which the at least one trigger point has been encoded is transmitted.

20 Claims, 3 Drawing Sheets

(56) References Cited

U.S. PATENT DOCUMENTS

2009/0262920 A1* 10/2009 Henrikson .......... H04L 65/1016
  379/221.09
2010/0250680 A1    9/2010 Bhatt
2010/0299442 A1   11/2010 Van Elburg
2019/0020693 A1*  1/2019 Evans ................. H04L 65/1016

* cited by examiner

DATA PROCESSING

CROSS-REFERENCE TO RELATED APPLICATIONS

This application is a continuation under 35 U.S.C. § 120 of U.S. application Ser. No. 14/696,138 which claims priority under 35 U.S.C. § 119(a) to United Kingdom patent application no. GB 1407344.9, filed on Apr. 25, 2014. Each of the above-referenced patent applications is incorporated by reference in its entirety.

BACKGROUND OF THE INVENTION

Field of the Invention

The present disclosure relates to data processing. In particular, but not exclusively, the present disclosure relates to processing data in a telecommunications network.

Description of the Related Technology

In a standard IP Multimedia Subsystem (IMS) network, when a Serving Call Session Control Function S-CSCF is processing a Session Initiation Protocol (SIP) request it looks up the Initial Filter Criteria (IFC) for the originating and/or terminating subscriber(s) from the Home Subscriber Service (HSS) and uses this to decide which application servers to invoke while processing the call. Typically, this means a set of application servers are invoked one after another by sending the SIP request (which could be an INVITE or other dialog initiating request) to each application server in turn. Each application server can either respond to the request itself (in which case, no later application servers in the list are invoked), or it can allow the request to continue by sending it back to the S-CSCF, possibly after modifying the message (in which case, the S-CSCF will route the request to the next application server in the list). This routing is achieved by adding two route headers to the message. The first route header has the uniform resource identifier (URI) of the application server. The second route header has a URI with the S-CSCF node's host name and an Original Dialog Identifier (ODI) token. The second Route header both allows the request to get back to the correct S-CSCF and allows the S-CSCF to find the state corresponding to the IFC so it can resume processing from the right point in the list.

The above process is complicated by the fact that the IFC have to be re-evaluated hop-by-hop in case an earlier application server changes the messages in a way that affects whether subsequent triggers in the IFC would fire. This means an implementation that simply calculates the list of application servers upfront then routes the message via them all will not work.

In a system which does not employ a longstanding assignment of a given subscriber to a given network routing node, i.e. any network routing node among a plurality of network routing nodes is enabled to process messages relating to any given subscriber, one way to implement the above process is to have each network routing node act as if it were a S-CSCF in the above processing, so that each request is processed by the same network routing node, and that network routing node maintains local state information that it correlates to the ODI tokens when requests come back from the application servers. With such a system, one decision which has to be made is how long to retain the state information associated with a request. One candidate lifetime is the lifetime of the SIP transaction associated with the request, so the state information would be discarded when a final response is sent to the initial SIP request. However, the IMS specifications are not definitive on this lifetime, and there are some possible application server flows that would not work with this lifetime.

For example, if an application server sends a final response to the initial request, then later sends the request back to the network routing node, the network routing node would not correlate the ODI token and would process the request as a new request, resulting in the request being sent back to the same application server. An example where this may occur is a calling card application, where the application server sends a final response to the initial request in order to establish a media connection on which to play a prompt and collect the calling card number, and sends the request back to the network routing node when the appropriate card number has been entered.

There is therefore an alternative school of thought that the state information associated with the SIP request should be longer than the SIP transaction in order to handle this case. Here, options would seem to include maintaining the information for a fixed time after the SIP transaction has ended, or to maintain the information for the entire duration of the SIP dialog. Given the likely use cases that hit this problem involve user input, a timer based solution is unlikely to work in all cases.

A traditional S-CSCF would have no problem maintaining the state information for the duration of the SIP dialog because it remains in the SIP signaling path for the whole dialog and so can maintain sufficient dialog state information. However, in a system which does not employ a longstanding assignment of a given subscriber to a given network routing node, network routing nodes may not stay in the SIP signaling path after the initial transaction and would not be able to maintain dialog state information.

It would therefore be desirable to provide improved measures for processing data in a telecommunications network, including maintaining state information associated with processing IFC.

SUMMARY

According to embodiments, there is a method of processing data in a telecommunications network, the method comprising: receiving a request message in relation to establishment of a communication session involving a given subscriber; receiving subscriber configuration data in relation to the establishment, the subscriber configuration data comprising a set of one or more trigger points at which one or more application services should be invoked in relation to communication sessions for the given subscriber; encoding, into an identifier for the communication session within the request message, at least one trigger point from the set of trigger points; and transmitting the request message including the identifier for the communication session in which the at least one trigger point has been encoded.

According to embodiments, there is a system for use in processing data in a telecommunications network, the system comprising at least one memory including computer program code; and at least one processor in data communication with the at least one memory, wherein the at least one processor is configured to: receive a request message in relation to establishment of a communication session involving a given subscriber; receive subscriber configuration data in relation to the establishment, the subscriber configuration data comprising a set of one or more trigger points at which one or more application services should be invoked in relation to communication sessions for the given subscriber; encode, into an identifier for the communication session within the request message, at least one trigger point from the set of trigger points; and transmit the request message including the identifier for the communication session in which the at least one trigger point has been encoded.

According to embodiments, there is a computer program product comprising a non-transitory computer-readable storage medium having computer readable instructions stored thereon, the computer readable instructions being executable by a computerized device to cause the computerized device to perform a method of processing data in a telecommunications network, the method comprising: receiving a request message in relation to establishment of a communication session involving a given subscriber; receiving subscriber configuration data in relation to the establishment, the subscriber configuration data comprising a set of one or more trigger points at which one or more application services should be invoked in relation to communication sessions for the given subscriber; encoding, into an identifier for the communication session within the request message, at least one trigger point from the set of trigger points; and transmitting the request message including the identifier for the communication session in which the at least one trigger point has been encoded.

According to embodiments, there is a method of processing data in a telecommunications network, the method comprising: receiving subscriber configuration data relating to a communication session involving a given subscriber, the subscriber configuration data comprising at least one initial filter criterion (IFC); and transmitting a message comprising an original dialog identifier (ODI) associated with the communication session, the ODI comprising an encoding of one or more of the at least one IFC.

Further features and embodiments of the present disclosure will become apparent from the following description of embodiments, given by way of example only, which is made with reference to the accompanying drawings.

DETAILED DESCRIPTION OF CERTAIN INVENTIVE EMBODIMENTS

Figure 1:
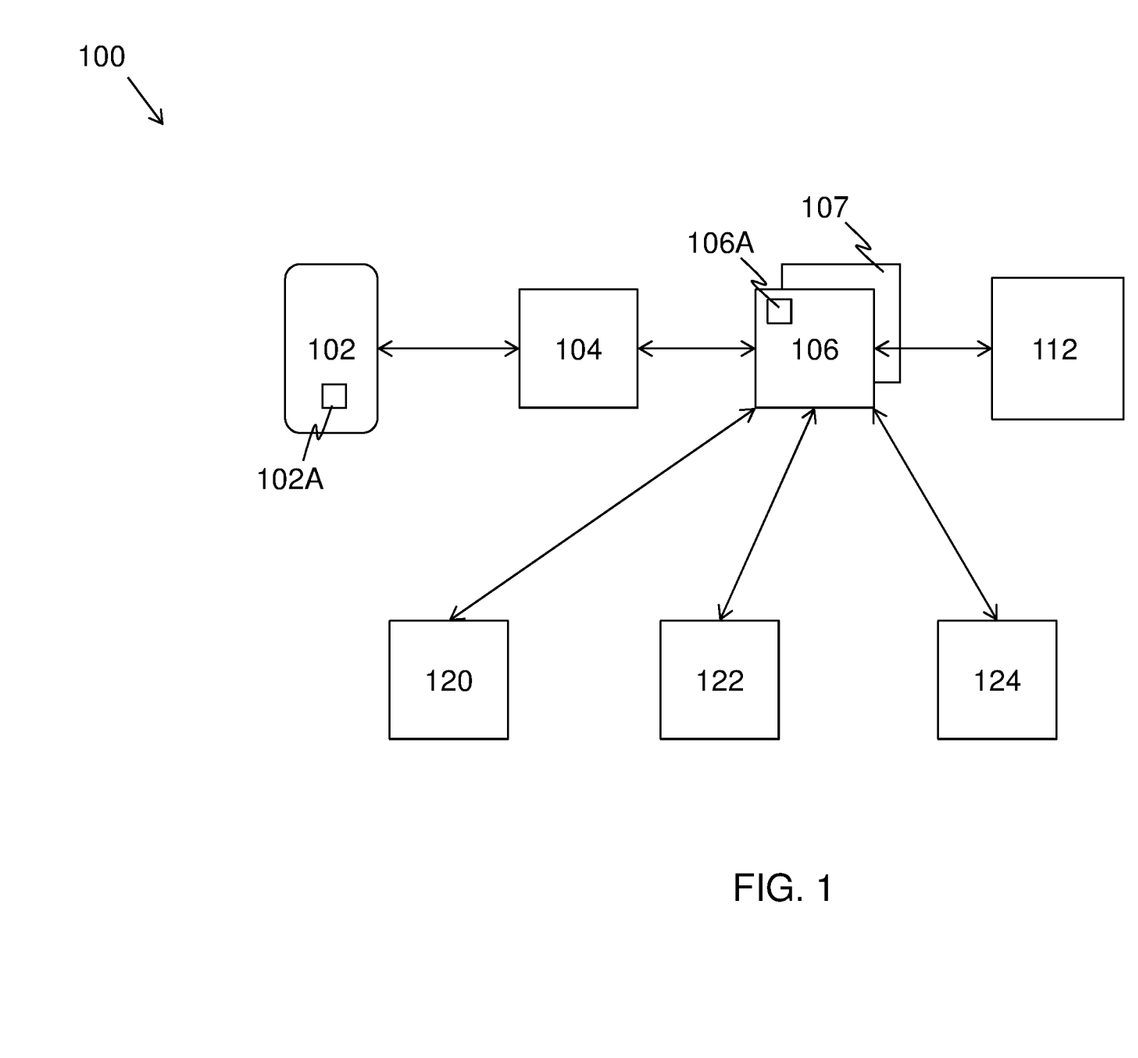
FIG. 1 shows an example telecommunications network in which one or more embodiments of the present invention may be practiced.

FIG. 1 illustrates an example telecommunications network 100 in which embodiments of the present disclosure may be practiced. Telecommunications network 100 comprises a plurality of network routing nodes, including network routing nodes 106 and 107, which are responsible for processing routing data relating to communication sessions conducted in telecommunications network 100. One or more of network routing nodes 106 and 107 may for example comprise a node performing the functions of one or more routers, servers, softswitches, CSCFs, SIP Routers, SIP Registrars, SIP Service Nodes, SIP Proxies, etc. Telecommunications network 100 may comprise further network routing nodes (not shown). In embodiments, each network node in the plurality of network nodes comprises a processing system (for example comprising one or more processors and/or memories), as for example depicted by processor 106A comprised within network node 106, for performing data processing and/or data storage tasks.

In certain embodiments a longstanding assignment of a given subscriber to a given network routing node is not employed. In such embodiments, any network routing node amongst the plurality of network nodes is able to process data, messages, etc. relating to any given subscriber and associated subscriber device(s). The plurality of network routing nodes 106 may be referred to as a cluster of network routing nodes. Network routing nodes in the cluster may perform tasks other than routing, for example conducting registration and/or authentication procedures, etc.

Subscriber device 102 is configured to conduct telephony sessions via telecommunications network 100. Subscriber device 102 comprises a processing system 102A, for example comprising memory and/or one or more processors, configurable to carry out various data processing and data storage tasks of embodiments. Subscriber device 102 could comprise any device capable of conducting communication (or 'media') sessions such as voice or video calls with one or more remote user devices (not shown) or network nodes. Subscriber device 102 could for example comprise a personal computer (PC), a mobile (or 'cellular') telephone, a voice over internet protocol (VoIP) telephone, a session initiation protocol (SIP) device, tablet, phablet, etc.

Subscriber device 102 communicates in telecommunications network 100 via edge proxy node 104. The communication link between subscriber device 102 and edge proxy node 104 may further comprise one or more intermediate entities, such as wireless access points, routing devices, etc. Edge proxy node 104 may be further responsible for interfacing between telecommunications network 100 and one or more further subscriber devices (not shown). Telecommunications network 100 may also comprise one or more further edge proxy nodes (not shown), each responsible for interfacing between telecommunications network 100 and a number of yet further subscriber devices (not shown). For example, each further edge proxy node may provide access to telecommunications network 100 for subscriber devices in different geographic locations.

In response to receiving a request message from subscriber device 102, edge proxy 104 allocates the request to one of the network routing nodes in the plurality (or 'cluster') of network nodes, for example network routing node 106 or network routing node 107. In some embodiments, the choice of network routing node is made randomly by edge proxy 104. In further embodiments, the choice of network routing node is made according to one or more load balancing criteria in order to distribute network load across the plurality of network routing nodes in the plurality. In embodiments, the one or more load balancing criteria allow request messages to be handled by any of the network routing nodes in the plurality.

Network routing node 106 is configured to communicate with subscriber configuration network node 112, which is responsible for storing and providing subscriber configuration data for subscriber devices in telecommunications network 100 (including subscriber device 102). In the case of IMS, subscriber configuration network node 112 may comprise an HSS. In embodiments, the interface between network routing node 106 and the HSS comprises a Cx interface, as defined in the IMS specifications.

Embodiments comprise a stateless scheme where instead of state information being kept by one or more network routing nodes, it is encoded in requests sent to application servers from the network routing nodes. Embodiments comprise encoding subscriber configuration data including one or more trigger points (or 'trigger conditions') in a communication session identifier (for example an Originating Dialog Identifier or ODI) within a request message. The trigger points may for example comprise IFC. Such features enable removal of the locally stored state at network routing nodes. Embodiments do not require any special (or 'non-standard') processing in the application servers. Embodiments meet the IMS specifications requirement that changes in trigger points such as IFC during communication session set-up are not acted on immediately.

In embodiments, network routing node 106 receives a request message in relation to establishment of a communication session involving a given subscriber; in this case, the subscriber is associated with subscriber device 102. Network routing node 106 retrieves subscriber configuration data in relation to the establishment from subscriber configuration network node 112. The subscriber configuration data which network routing node 106 receives in relation to establishment of the communication session involving the given subscriber comprises a set of one or more trigger points at which one or more application services should be invoked in relation to communication sessions for the given subscriber. Network routing node 106 encodes, into an identifier for the communication session within the request message, at least one trigger point from the set of trigger points, and transmits the request message including the identifier for the communication session in which the at least one trigger point has been encoded.

Embodiments comprise evaluating trigger points in the set to determine whether a given trigger point that fires for the communication session is found; in such embodiments the encoding is carried out in response to the evaluation finding a given trigger point. The evaluation may for example be performed by network node 106.

In embodiments, the encoding comprises inserting a route header into the transmitted request message.

In embodiments, the transmitted request message is routed to an application server at which an application service associated with the at least one trigger point can be invoked in relation to the communication session.

In embodiments, the inserted route header comprises a host part set to a network address of a network routing node and a user part comprising the encoded identifier.

In embodiments, the inserted route header comprises a host part set to a domain address of the plurality of network routing nodes and a user part comprising the encoded identifier. The particular network routing node in the plurality (or 'cluster) of network routing nodes at which any response is received and/or subsequently processed may be different from the network routing node which performed the insertion. The particular network routing node can for example be determined by one or more load balancing criteria which are applied between network routing nodes in the plurality.

In alternative embodiments, the inserted route header comprises a host part set to a network address of a network routing node and a user part comprising the encoded identifier.

In embodiments, the encoding comprises inserting a route header into the transmitted request message for each trigger point in the set other than the given trigger point.

In embodiments, no route header is inserted in the transmitted request message for the given trigger point.

Embodiments comprise, in response to transmittal of the request message, receiving a forwarded request message from an application server, further determining that the received forwarded request message contains an identifier for a communication session in which at least one trigger point has been encoded, and further evaluating trigger points in the received forwarded request message to further determine whether a further trigger point that fires for the communication session is found. The further determining and/or further evaluation may for example be performed by a different network routing node to network routing node 106, for example network routing node 107 or a further different network routing node.

Embodiments comprise, in response to the further evaluation finding a further trigger point that fires for the communication session, further encoding, into an identifier for the communication session within a further request message, at least one further trigger point from the set of trigger points, and transmitting the further request message including the identifier for the communication session in which the at least one further trigger point has been encoded. The further encoding and/or transmittal of the further forwarded request message may for example be performed by a different network routing node to network routing node 106, for example network routing node 107. Embodiments may comprise further rounds of processing of trigger points in the set by further network nodes and further application servers until all trigger points in the set have been appropriately dealt with.

Embodiments comprise, in response to the further evaluation finding no further trigger point that fires for the communication session, performing final routing for the received request message. The final routing may for example be performed by a different network routing node to network routing node 106, for example network routing node 107 or a further different network routing node.

Embodiments comprise, in response to transmittal of the request message, receiving a forwarded request message from an application server, further determining that the received forwarded request message does not contain an identifier for a communication session in which at least one trigger point has been encoded, and performing final routing for the received request message. One or more of the receipt of a forwarded request message, the further determining and the final routing may for example be performed by a different network routing node to network routing node 106, for example network routing node 107 or a further different network routing node.

In embodiments, each trigger point in the set has an associated priority, and one or more of the evaluation and the further evaluation are performed on trigger points in order of their associated priorities to determine whether a trigger point that fires for the communication session is found.

In embodiments, the set of trigger points comprises at least one more trigger point other than the given trigger point, and the encoding comprises encoding one or more trigger points in the set other than the given trigger point.

In embodiments, the set of trigger points does not comprise any more trigger points other than the given trigger point. Such embodiments comprise still further encoding, into the identifier for the communication session, an indication that processing of the set of trigger points is complete for the communication session, and performing final routing for the received request message. The indication that processing of the set of trigger points is complete may for example comprise a special ODI token that indicates the IFC processing is complete. The still further encoding may for example be performed by a different network routing node to network routing node 106, for example network routing node 107 or a further different network routing node.

In embodiments, the encoding comprises performing a compression encoding.

In embodiments, the set of one or more trigger points comprise initial filter criteria (IFC).

In embodiments, the communication session identifier comprises a SIP dialog identifier. In embodiments, the communication session identifier comprises an original dialog identifier (ODI) for the communication session.

In embodiments, the request message and subscriber configuration data are received at network routing node 106, and the encoding and transmitting are performed by network routing node 106, where network routing node 106 comprises one of a plurality of network routing nodes responsible for processing routing data relating to communication sessions conducted in the network.

In embodiments, the forwarded request message is received by a different network routing node 107 in the plurality of network routing nodes and the further determining and the further evaluation are performed by the different network routing node.

In embodiments, the further encoding and the transmittal of the further request message or the final routing are performed by different network routing node 107.

In embodiments, the subscriber configuration data is received from a subscriber configuration network node 112 in response to a request transmitted from network routing node 106; in such embodiments, subscriber configuration network 112 node comprises a subscriber configuration network node responsible for storing subscriber configuration data for a plurality of subscribers.

Embodiments comprise, prior to the evaluation, performing a filtering process on the trigger points in the set to remove one or more trigger points that will not fire; in such embodiments, removed trigger points are not involved in the evaluation. In some embodiments, removed trigger points are not encoded in the transmitted request message.

In embodiments, the one or more removed trigger points comprise one or more of:

trigger points relating to a register message, trigger points where a profile part indicator does not correspond to a current registration state of the given subscriber, and trigger points where session case conditions determine that the trigger points will not fire.

Embodiments comprise measures, including methods, apparatus, computer software and computer program products) for processing data in a telecommunications network. Subscriber configuration data relating to a communication session involving a given subscriber is received. The subscriber configuration data comprises at least one initial filter criterion (IFC). A message comprising an original dialog identifier (ODI) associated with the communication session is transmitted, with the ODI comprising an encoding of one or more of the at least one IFC. The IFC may for example be compression encoded into the ODI. The message may for example be transmitted to an application server for invocation of one or more appropriate application services.

Embodiments are now described where a request message received by network routing node 106 comprises a SIP request, the set of one or more trigger points comprise IFC and the communication session identifier in which the IFC are encoded comprises an ODI for the communication session.

When network routing node 106 first receives a SIP request for which it needs to do IFC processing it reads the IFC from subscriber configuration data node 112, orders the IFC triggers according to the priority encoded with each trigger and carries out a pre-filtering operation to remove any triggers that will definitely not be fired. In some embodiments, network routing node 106 discards any triggers which relate to REGISTER messages, any triggers where the Profile Part Indicator does not correspond to the current registration state of the user, and/or any triggers where Session Case conditions mean the trigger will not fire. Both Profile Part Indicator and Session Case are parameters in the IMS defined IFCs and are part of the criteria used to determine when IFCs are triggered. The Profile Part Indicator parameter specifies conditions on whether the user is currently registered to the network or not and may for example be used in an IFC to specify that a call for a user should be forwarded immediately to a voicemail application server if the user's phone is not currently connected to the network. The Session Case parameter relates to whether the processing relates to an outgoing call (that is, a call dialed by the user), an incoming call, or a diverted call (that is, an incoming call for the user that is being forwarded to another number).

In embodiments, network routing node 106 then evaluates the ordered list of triggers until it finds one that fires.

If a trigger fires, network routing node 106 adds a Route header to cause the message to be routed to the application server in the trigger. If there are no more triggers in the IFC, network routing node 106 adds a Route header with the host part set to the domain name of the network routing node 106 and the user part set to a special ODI token that indicates that IFC processing is complete. If there are more triggers in the IFC, network routing node 106 adds a Route header for each remaining IFC with the host part set to the network address of network routing node 106 or the domain name for the cluster of network routing nodes and the user part set to an ODI token containing an encoding (for example a compressed encoding) of the trigger.

In embodiments, if no trigger fires, network routing node 106 moves on to do normal (or 'final') routing on the request.

In embodiments, when an application server forwards a SIP request back to network routing node 106, the application server includes a copy of all route headers from the received request (apart from the first one).

In embodiments, when network routing node 106 receives a SIP request sent by an application server it checks for an ODI token in the top-most Route header. If the ODI token is the special ODI token that indicates IFC processing is complete, network routing node 106 removes the Route header and does final routing on the message. If the ODI token is an ODI token encoding an IFC trigger, network routing node 106 (or other network routing node in the cluster) decodes the trigger and evaluates it against the SIP request. If the trigger fires, network routing node 106 (or other network routing node in the cluster) removes the Route header and forwards the request to the corresponding application server by adding a suitable Route header. If there are no more Route headers with ODI tokens, network routing node 106 (or other network routing node in the cluster) appends a Route header with the special "end" ODI token. If the trigger does not fire, network routing node 106 (or other network routing node in the cluster) removes the Route header and repeats this processing with the next Route header.

In embodiments, the encoding comprises performing a compression encoding. A compression scheme is useful for keeping the message sizes sensible. For example, an example compression encoding scheme could replace each XML tag in each IFC entry with a single byte non-ASCII code then using deflate compression with a small pre-initialized dictionary. Such an example compression encoding scheme allows a default IFC to compress down from over 300 bytes to 51 bytes (or 68 bytes when Base64 encoded to make it suitable for inclusion in a SIP header). This leads to approximately 100 bytes extra in each message for each unfiltered IFC trigger after the first one. There are alternative compression schemes that would give even larger compression ratios, for example transforming each IFC entry into an internal binary encoding then compressing that encoding.

Figure 2:
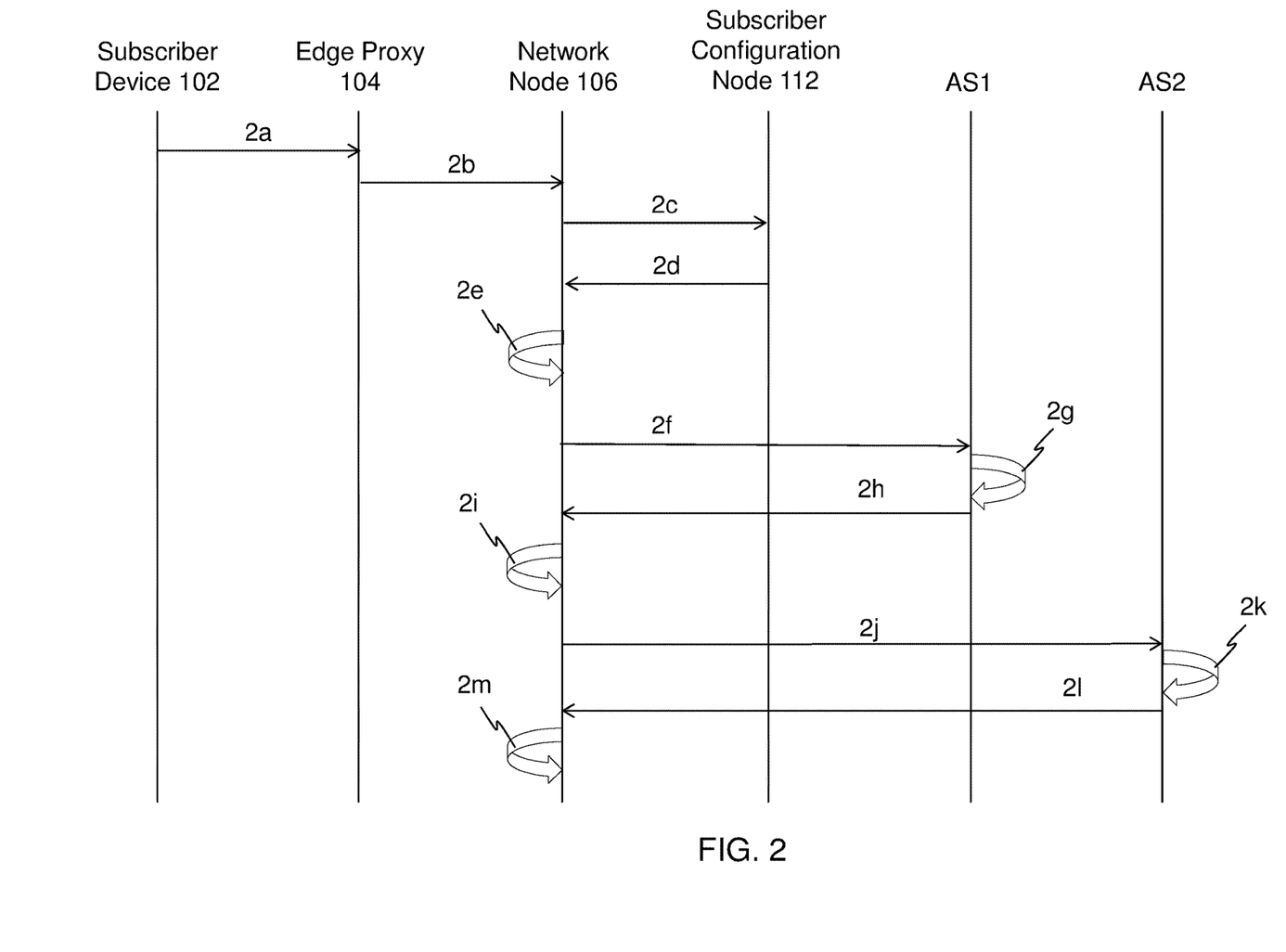
FIG. 2 shows a flow diagram according to one or more embodiments of the present invention.

FIG. 2 shows a flow diagram according to embodiments. Establishment of a communication session is initiated in telecommunications network 100 by a user (the given subscriber) of subscriber device 102 which causes a request message to be transmitted to network routing node 106 via edge proxy node 104 in steps 2a and 2b. Upon receipt of the request message of step 2b, network routing node 106 sends a request for subscriber configuration data relating to the establishment of the communication session to subscriber configuration data node 112 in step 2c, which data is provided to network routing node 106 in step 2d. The subscriber configuration data received in step 2d comprises a set of one or more trigger points at which one or more application services should be invoked in relation to communication sessions for the given subscriber of subscriber device 102.

In step 2e, network routing node 106 evaluates trigger points in the set until it finds a trigger point that fires for the communication session and encodes, into an identifier for the communication session within the request message, at least one trigger point from the set of trigger points. This may for example involve encoding some or all of the remaining unevaluated trigger points in the set. In step 2f, network routing node 106 transmits the request message including the identifier for the communication session in which the at least one trigger point has been encoded to application server 1 (denoted AS1 in FIG. 2). In step 2g, application server 1 invokes one or more appropriate application services in relation to the request and forwards the request back to network node 106 in step 2h. In step 2i, network routing node 106, determines, that the received forwarded request message of step 2h contains an identifier for a communication session in which at least one trigger point has been encoded and further evaluates trigger points in the received forwarded request message to determine whether a further trigger point that fires for the communication session is found. In this case, a further trigger point that fires for the communication session is found and network node 106 encodes, into an identifier for the communication session within a further request message, at least one further trigger point from the set of trigger points and transmits the further request message including the identifier for the communication session in which the at least one further trigger point has been encoded to application server 2 (denoted AS2 in FIG. 2) in step 2j. In step 2k, application server 2 invokes one or more appropriate application services in relation to the request and forwards a request back (i.e. responds) to network node 106 in step 2l.

In step 2m, network node 106 then further evaluates trigger points in the received forwarded request message to determine whether a further trigger point that fires for the communication session is found. In this case, no further trigger point that fires for the communication session is found, so network node 106 performs final routing for the received request message, for example forwarding an appropriate request message to another network routing node or other subscriber device, etc.

Figure 3:
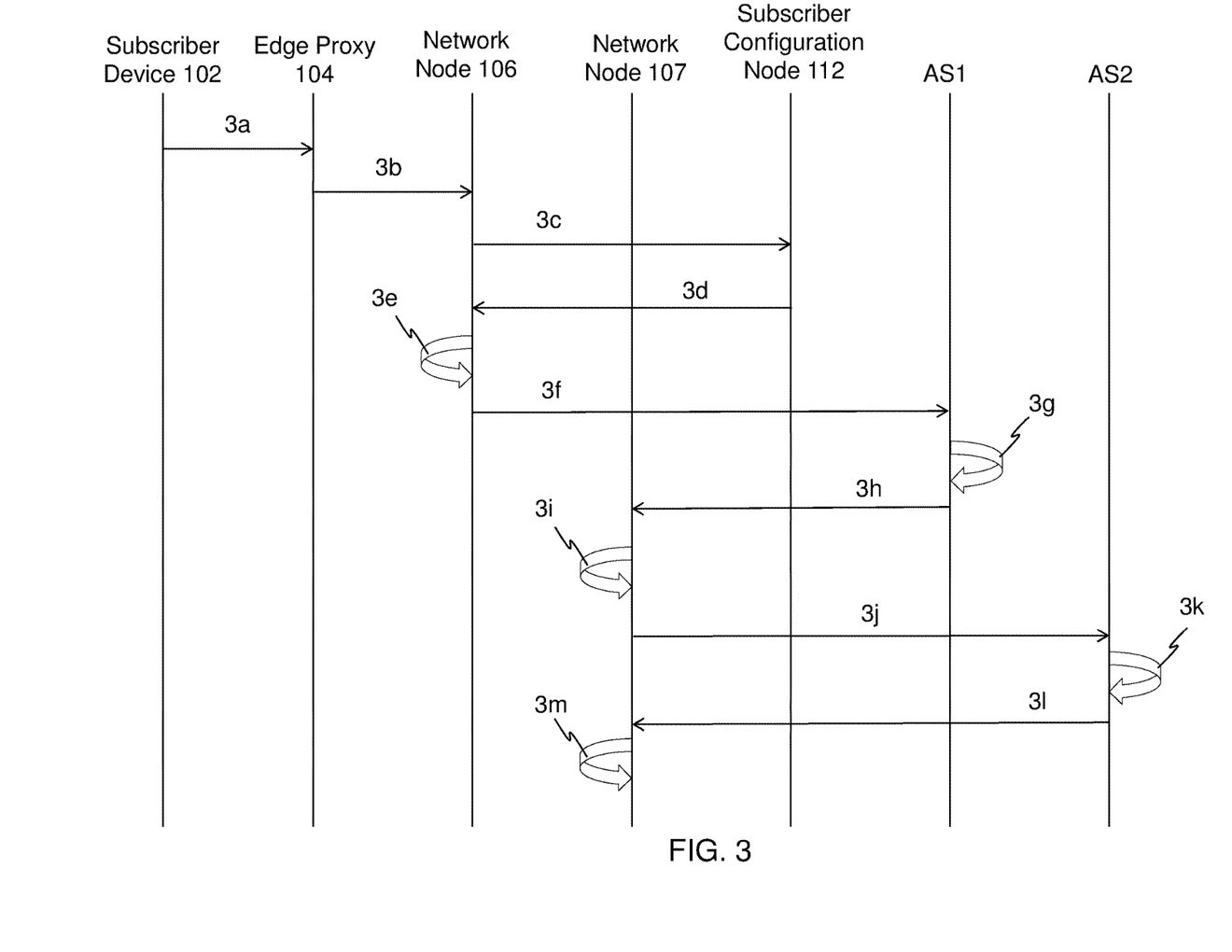
FIG. 3 shows a flow diagram according to one or more embodiments of the present invention.

FIG. 3 shows a flow diagram according to embodiments. Steps 3a to 3f of FIG. 3 are carried out in a similar manner to steps 2a to 2f of FIG. 2 respectively. In step 3g, application server 1 invokes one or more appropriate application services in relation to the request. However, instead of forwarding a request back to network node 106 as in step 2h, here application server 1 forwards a request back to a different network routing node in the plurality of network routing nodes in step 3h, in this case to network routing node 107. The request of step 3h may for example be transmitted to a domain associated with the plurality of network routing nodes and may for example be allocated to network routing node 107 on a random or load balancing basis.

In step 3i, network routing node 107, determines, that the received forwarded request message of step 3h contains an identifier for a communication session in which at least one trigger point has been encoded and still further evaluates trigger points in the received forwarded request message to determine whether a further trigger point that fires for the communication session is found. In this case, a further trigger point that fires for the communication session is found and network node 107 encodes, into an identifier for the communication session within a still further request message, at least one still further trigger point from the set of trigger points and transmits a still further request message including the identifier for the communication session in which the at least one still further trigger point has been encoded to application server 2 in step 3j. In step 3k, application server 2 invokes one or more appropriate application services in relation to the request and forwards a request back to network node 107 in step 3l.

In step 3m, network node 107 then yet still further evaluates trigger points in the received forwarded request message to determine whether a further trigger point that fires for the communication session is found. In this case, no further trigger point that fires for the communication session is found, so network node 107 performs final routing for the received request message.

In alternative embodiments, instead of application server 2 forwarding a request back to network node 107 in step 3l, application server 1 forwards a request back to a different network routing node in the plurality of network routing nodes in step 3l, for example a further network routing node (not shown). The request of step 3l may for example be transmitted to a domain address associated with the plurality of network routing nodes and may for example be allocated to the further network routing node on a random or load balancing basis. The further network routing node may then perform final routing for the received request message in a similar as performed by network routing node 107 in step 3m.

The above embodiments are to be understood as illustrative examples of the present disclosure. Further embodiments of the present disclosure are envisaged.

In the embodiments of FIGS. 2 and 3 described above, a communication session is initiated at subscriber device 102, i.e. an outgoing communication session establishment request (where the subscriber is the calling party). Embodiments can also be applied for an incoming communication session establishment request to subscriber device 102 (where the subscriber is the called party).

In alternative embodiments, the node name of the particular network routing is included in one or more route headers, so that each request is handled by the same network routing node at every step. This has some benefits in terms of reliability because each request is only exposed to possible failure of one network routing node.

In further alternative embodiments, multiple or all outstanding trigger points (for example IFC) are encoded in a single Route header. Such embodiments provide better compression, with a possible extra processing cost at each step due to decompression and re-compression of the multiple or full set of trigger points (for example IFC).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of processing data in a telecommunications network, the method comprising:
receiving a request message in relation to establishment of a communication session involving a given subscriber;
receiving subscriber configuration data in relation to the establishment, the subscriber configuration data comprising a set of one or more trigger points at which one or more application services should be invoked in relation to communication sessions for the given subscriber;
compressing at least one trigger point from the set of trigger points, and including the compressed at least one trigger point in an identifier for the communication session within the request message, such that the identifier contains the compressed at least one trigger point from the set of trigger points; and
transmitting the request message including the identifier for the communication session containing the compressed at least one trigger point.

2. The method of claim 1, comprising evaluating trigger points in the set to determine whether a given trigger point that fires for the communication session is found, wherein the compressing and including is carried out in response to the evaluation finding a given trigger point.

3. The method of claim 2, wherein the compressing and including comprises inserting a route header into the transmitted request message for each trigger point in the set other than the given trigger point.

4. The method of claim 2, wherein each trigger point in the set has an associated priority, and one or more of the evaluation and the further evaluation are performed on trigger points in order of their associated priorities to determine whether a trigger point that fires for the communication session is found, and/or
wherein the set of trigger points comprises at least one more trigger point other than the given trigger point, and the compressing and including comprises compressing and including one or more trigger points in the set other than the given trigger point.

5. The method of claim 2, comprising, prior to the evaluation, performing a filtering process on the trigger points in the set to remove one or more trigger points that will not fire,
wherein removed trigger points are not involved in the evaluation.

6. The method of claim 5, wherein removed trigger points are not included in the transmitted request message, and/or wherein the one or more removed trigger points comprise one or more of:
trigger points relating to a register message,
trigger points where a profile part indicator does not correspond to a current registration state of the given subscriber, and
trigger points where session case conditions determine that the trigger points will not fire.

7. The method of claim 1, wherein the step of including comprises inserting a route header into the transmitted request message.

8. The method of claim 7, wherein the transmitted request message is routed to an application server at which an application service associated with the at least one trigger point can be invoked in relation to the communication session.

9. The method of claim 7, wherein the inserted route header comprises a host part set to a network address of a network routing node and a user part comprising the identifier containing the compressed at least one trigger point.

10. The method of claim 1, comprising:
in response to transmittal of the request message, receiving a forwarded request message from an application server;
further determining that the received forwarded request message contains an identifier for a communication session containing a compressed at least one trigger point; and
further evaluating trigger points in the received forwarded request message to further determine whether a further trigger point that fires for the communication session is found.

11. The method of claim 10, comprising, in response to the further evaluation finding no further trigger point that fires for the communication session, performing final routing for the received request message.

12. The method of claim 10, wherein the request message and subscriber configuration data are received at a network routing node, and the compressing, including and transmitting are performed by the network routing node, the network routing node comprising one of a plurality of network routing nodes responsible for processing routing data relating to communication sessions conducted in the network, and
wherein the forwarded request message is received by a different network routing node in the plurality of network routing nodes and the further determining and the further evaluation are performed by the different network routing node.

13. The method of claim 12, comprising, in response to the further evaluation finding a further trigger point that fires for the communication session, further compressing at least one further trigger point from the set of trigger points, and including the compressed at least one further trigger point in an identifier for the communication session within a further request message, such that the identifier contains the compressed at least one further trigger point from the set of trigger points; and
further transmitting the further request message including the identifier for the communication session containing the compressed at least one further trigger point,
wherein the further encoding and the transmittal of the further request message or the final routing are performed by the different network routing node.

14. The method of claim 1, comprising,
in response to transmittal of the request message, receiving a forwarded request message from an application server;
determining that the received forwarded request message does not contain an identifier for a communication session containing a compressed at least one trigger point; and
performing final routing for the received request message.

15. The method of claim 1, wherein the set of trigger points does not comprise any more trigger points other than the given trigger point, the method comprising:
encoding, into the identifier for the communication session, an indication that processing of the set of trigger points is complete for the communication session; and
performing final routing for the received request message.

16. The method of claim 1, wherein the set of one or more trigger points comprise initial filter criteria (IFC), and/or
wherein the communication session identifier comprises a SIP dialog identifier, and/or
wherein the communication session identifier comprises an original dialog identifier (ODI) for the communication session.

17. The method of claim 1, wherein the request message and subscriber configuration data are received at a network routing node, and the compressing, including and transmitting are performed by the network routing node, the network routing node comprising one of a plurality of network routing nodes responsible for processing routing data relating to communication sessions conducted in the network.

18. The method of claim 1, wherein the subscriber configuration data is received from a subscriber configuration network node in response to a request transmitted from the network routing node, the subscriber configuration network node comprising a network node responsible for storing subscriber configuration data for a plurality of subscribers.

19. A computer program product comprising a non-transitory computer-readable storage medium having computer readable instructions stored thereon, the computer readable instructions being executable by a computerized device to cause the computerized device to perform a method of processing data in a telecommunications network, the method comprising:
receiving a request message in relation to establishment of a communication session involving a given subscriber;
receiving subscriber configuration data in relation to the establishment, the subscriber configuration data comprising a set of one or more trigger points at which one or more application services should be invoked in relation to communication sessions for the given subscriber;
compressing at least one trigger point from the set of trigger points, and including the compressed at least one trigger point in an identifier for the communication session within the request message, such that the identifier contains the compressed at least one trigger point from the set of trigger points; and
transmitting the request message including the identifier for the communication session containing the compressed at least one trigger point.

20. A method of processing data in a telecommunications network, the method comprising:
receiving subscriber configuration data relating to a communication session involving a given subscriber, the subscriber configuration data comprising at least one initial filter criterion (IFC);
compressing at least one IFC; and
transmitting a message comprising an original dialog identifier (ODI) associated with the communication session, the ODI containing the compressed at least one IFC.

* * * * *